United States Patent [19]
Jackson et al.

[11] Patent Number: 6,000,294
[45] Date of Patent: Dec. 14, 1999

[54] SYSTEM AND METHOD FOR FLUID ASSISTED SHIFTING OF MECHANICAL TRANSMISSIONS

[75] Inventors: Graeme A. Jackson, Bolton; Alan J. Fielding, Manchester, both of United Kingdom

[73] Assignee: Eaton Corporation, Cleveland, Ohio

[21] Appl. No.: 09/185,176

[22] Filed: Nov. 3, 1998

[30] Foreign Application Priority Data

Nov. 15, 1997 [GB] United Kingdom .................... 9724065
Dec. 16, 1997 [GB] United Kingdom .................... 9726439

[51] Int. Cl.$^6$ .................................................. F16H 59/04
[52] U.S. Cl. .......................................... 74/335; 74/473.11
[58] Field of Search ......................... 74/335, 339, 473.11

[56] References Cited

U.S. PATENT DOCUMENTS

| | | |
|---|---|---|
| 3,470,759 | 10/1969 | Labat .................................... 74/473.11 |
| 3,766,793 | 10/1973 | Knop . |
| 4,193,316 | 3/1980 | Kelbel . |
| 4,222,281 | 9/1980 | Mylenek . |
| 4,532,823 | 8/1985 | Razzacki . |
| 4,550,627 | 11/1985 | Lauer et al. . |
| 4,648,290 | 3/1987 | Dunkley et al. . |
| 4,899,607 | 2/1990 | Stainton . |
| 4,920,815 | 5/1990 | Reynolds . |
| 5,357,822 | 10/1994 | Lanting et al. . |
| 5,517,876 | 5/1996 | Genise et al. . |
| 5,562,011 | 10/1996 | Bartus . |
| 5,571,059 | 11/1996 | Desautels et al. . |
| 5,850,760 | 12/1998 | Jin et al. .............................. 74/473.11 |

Primary Examiner—Dirk Wright
Attorney, Agent, or Firm—Howard D. Gordon

[57] ABSTRACT

A shifting mechanism for a mechanical transmission includes a selector shaft having associated shift forks for engaging or disengaging a selected gear ratio and a control rod directionally coupled to the selector shaft for positive rotation while allowing a predetermined relative axial translation. A cylinder assembly is operatively associated with the selector shaft and control rod to provide a fluid coupling which applies a force on the selector shaft in response to the relative translation between the selector shaft and the control rod to reduce the operator effort required to complete a gear shift.

17 Claims, 5 Drawing Sheets

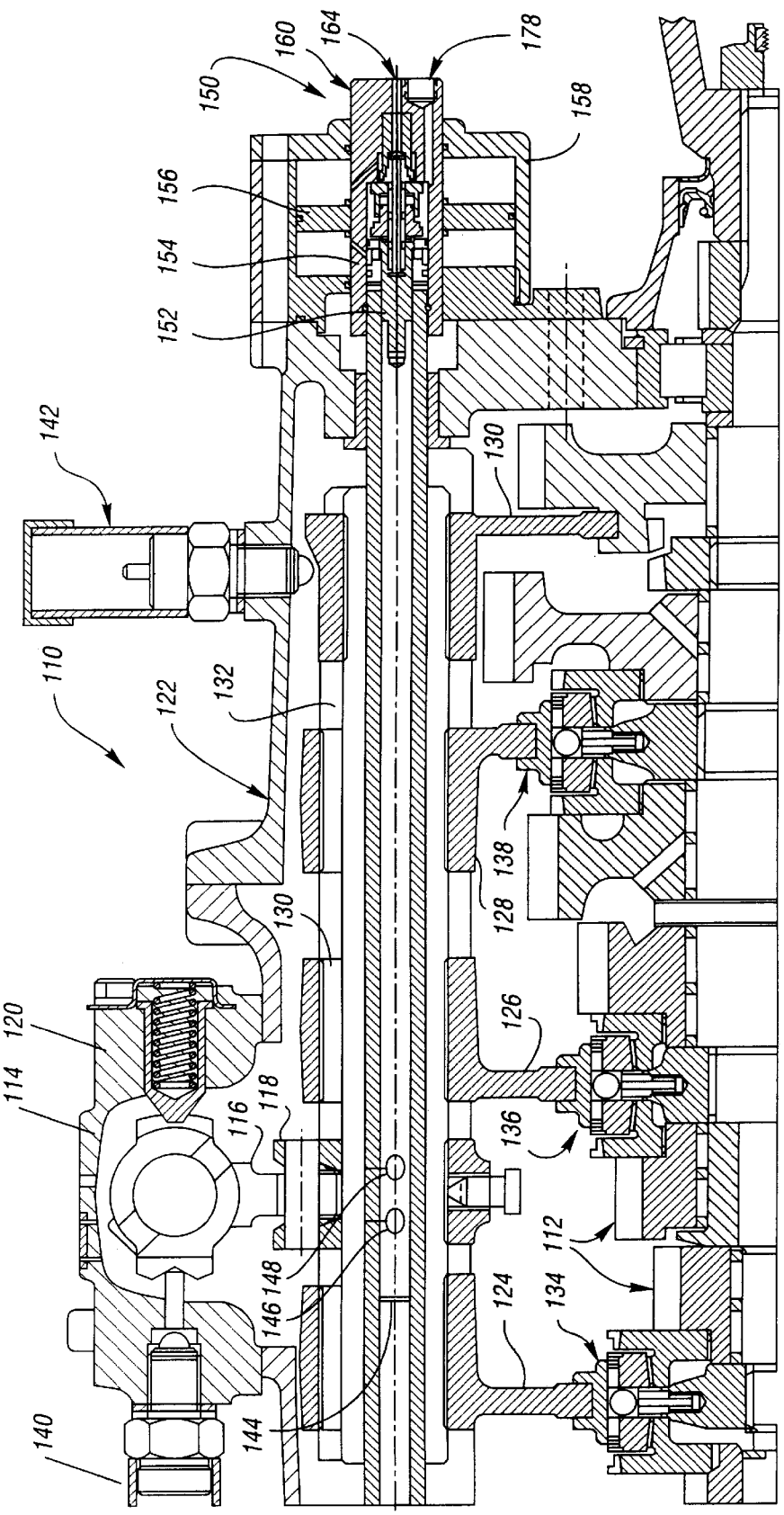

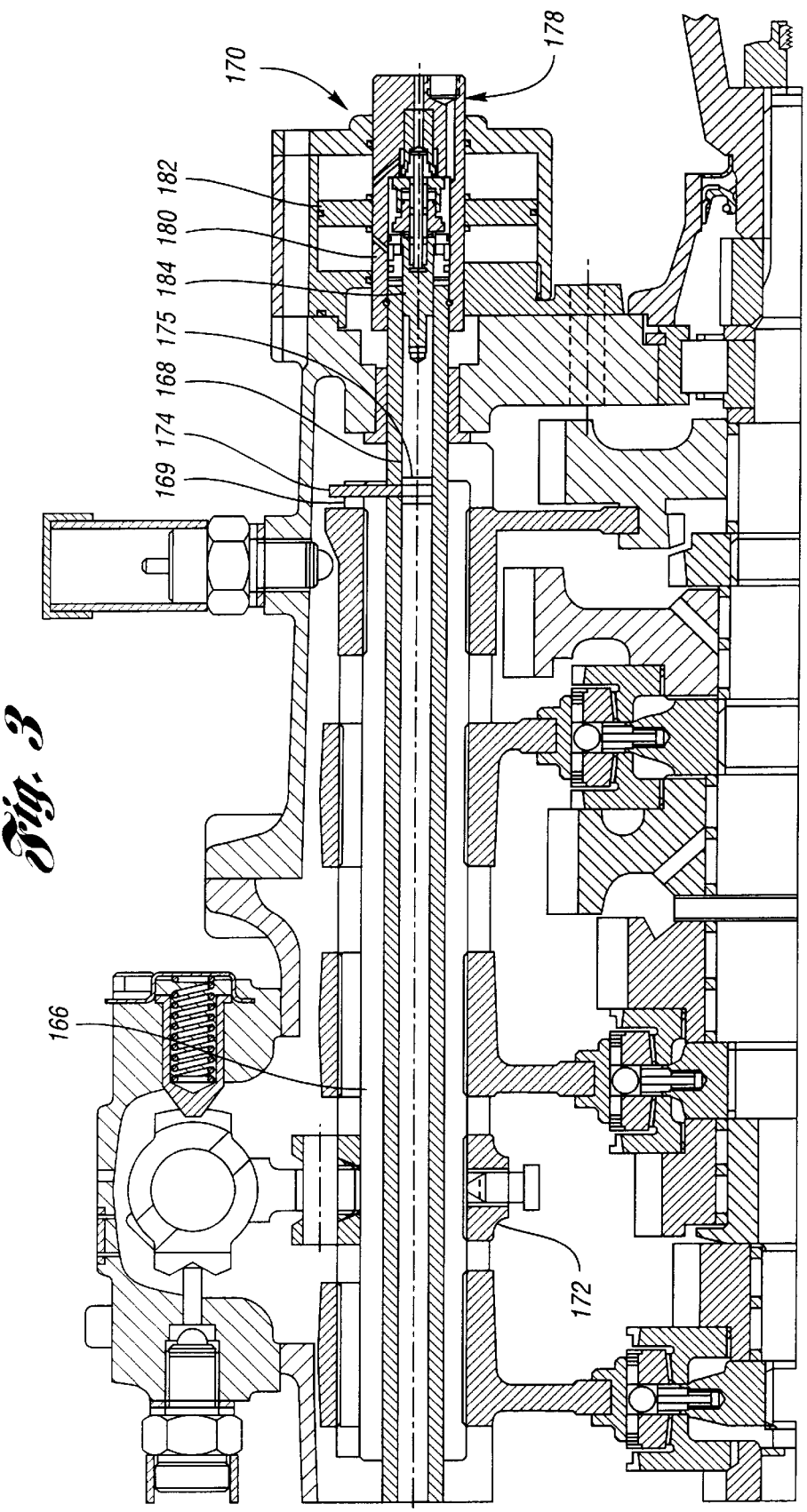

SYSTEM AND METHOD FOR FLUID ASSISTED SHIFTING OF MECHANICAL TRANSMISSIONS

TECHNICAL FIELD

The present invention relates to a system and method for shifting mechanical transmissions using pressurized fluid to reduce the operator effort necessary to shift gears.

BACKGROUND ART

Conventional mechanical transmissions, particularly those for heavy-duty trucks, typically use a gear shift lever coupled to the transmission via a mechanical linkage to effect a ratio change or shifting of the transmission. In these transmissions it is desirable to minimize the effort required by the driver to shift the transmission to reduce driver fatigue while still maintaining an acceptable "feel" for the driver. More recently, automated and semi-automated mechanical transmissions have been developed which utilize one or more remote actuators to effect a gear change in the transmissions. In these transmissions, it is desirable to reduce shift force so that the associated actuators may be reduced in size and/or power required, resulting in cost and weight reduction of the overall vehicle system.

Various transmission shifting mechanisms have been developed and applied to both the traditional (manual) mechanical transmissions and the automated or semi-automated mechanical transmissions. Shifting mechanisms which utilize a single shifting shaft or rail for selecting and engaging the ratios of a multiple speed vehicular mechanical transmission are known in the prior art as may be seen by reference to U. S. Pat. Nos. 4,621,537; 4,532,823; and 4,222,281, the disclosures of which are hereby incorporated by reference. Such mechanisms may have advantages relative to multiple shift rail devices such as those disclosed in U.S. Pat. Nos. 4,445,393; 4,275,612; 4,584,895 and 4,722,237, the disclosures of which are hereby incorporated by reference. These advantages may include reduced complexity (fewer parts), the ability to use improved bearings and better surface finishes since only a single shaft is involved, a smaller package, and relatively easier control of an auxiliary transmission including sensing of transmission conditions such as neutral and gear-state conditions.

Regardless of the particular shifting mechanism used, gear change transmissions generally use a shift bar housing assembly. Typically, such shift bar housings are manually controlled and operated by a shift finger fixed to a directly mounted shift lever or to the cross shaft of a remotely controlled shifting mechanism. To prevent selection of more than one gear at any particular time, interlock mechanisms are provided. The shift bar housing assembly contains one or more axially moveable shift bars, shift rails, or shift rods. Each shift rail carries at least one shift fork, which is axially moved to engage or disengage a selected transmission gear. The shift rail (or shift fork in a single shift rail transmission) is generally selected by a transverse (left or right) movement of an actuator or shift lever. The selected gear is engaged or disengaged with an axial or longitudinal (forward or backward) movement of the shift rail which causes an axial movement of a clutch member, a gear carrying clutch teeth, or a jaw clutch, as well known in the prior art, and may be seen by reference to U.S. Pat. Nos. 4,445,393; 4,754,665; 4,876,924; and 5,053,961, the disclosures of which are hereby incorporated by reference.

Shift bar housing assemblies which are not directly operated by the driver are also known in the prior art. Such assemblies may be actuated by pressurized hydraulic fluid, pressurized air, or electric motors and have suitable controls therefor, as may be seen by reference to U.S. Pat. Nos. 4,428,248; 4,445,393; 4,722,237 and 4,873,881, all assigned to the assignee of the present invention and all hereby incorporated by reference.

DISCLOSURE OF INVENTION

An object of the present invention is to provide a system and method for shifting a mechanical transmission which reduces the effort required by the operator while maintaining an acceptable shift feel.

A further object of the present invention is to provide a system and method for shifting a mechanical transmission which utilizes a pressurized fluid to reduce the shift force required by the driver.

Yet another object of the present invention is to provide a system and method for shifting a mechanical transmission which reduces operator shifting effort while being applicable to both simple and compound transmissions.

A still further object of the present invention is to provide a system and method for shifting a single rail mechanical transmission which uses pressurized fluid to reduce operator shift force.

Another object of the present invention is to provide a single shift rail mechanical transmission having a shift assist system integrated with the gear shift rail.

Still another object of the present invention is to provide a system and method for shifting a mechanical change gear transmission which produces an assisting force proportional to the force exerted on the shift lever by the operator.

In carrying out the above objects and other objects, features, and advantages of the present invention, a system for reducing operator effort in shifting a mechanical transmission includes a control member fluidly coupled to a shift member for a predetermined travel distance via a proportional valve and piston arrangement. The control member is connected to a valve plunger while the shift member is connected to a valve body of the proportional valve. Relative movement between the control member and shift member provides proportional air flow to the piston to provide an assist force proportional to the force applied to the shift lever. In one embodiment the shift finger is coupled to the control member via pins placed through slots which are elongated to provide the predetermined travel distance. In another embodiment, the shift finger is directly connected to the shift member which is pinned to the control member using slots as in the first embodiment. Another embodiment utilizes a proportional valve and piston arrangement for each shift rail in a multiple shift rail mechanical transmission.

A method is also provided in accordance with the teachings of the present invention.

A number of advantages are associated with the present invention. For example, the system and method of the present invention provide a shift assist device integrated with the shifting mechanism. The present invention does not require electronic sensing of a cross-gate position or shift lever load yet provides a shift assist force in proportion to the shift lever load. The present invention provides a limited fluid coupling such that a positive mechanical coupling is used to shift the transmission in the event that fluid pressure is lost or excessive shift lever force is applied. For multiple rail transmissions having a valve and piston arrangement for each shift rail, the force for each synchronizer may be varied using different piston sizes without the necessity for additional valve control.

The above advantages in addition to other advantages, features, and objects of the present invention will be readily apparent to one of ordinary skill in the art from the following detailed description of the invention when read with the accompanying drawings.

BRIEF DESCRIPTION OF DRAWINGS

FIG. 2 is a partial cross-sectional view of a simple mechanical transmission illustrating a system and method for reducing operator shifting effort where a shift finger is pinned to a control member according to the present invention;

FIG. 3 is a partial cross-sectional view of an alternative embodiment for reducing operator shifting effort where a shift finger is coupled to a shift member which is pinned to a control member according to the present invention.

BEST MODE FOR CARRYING OUT THE INVENTION

Figure 1:
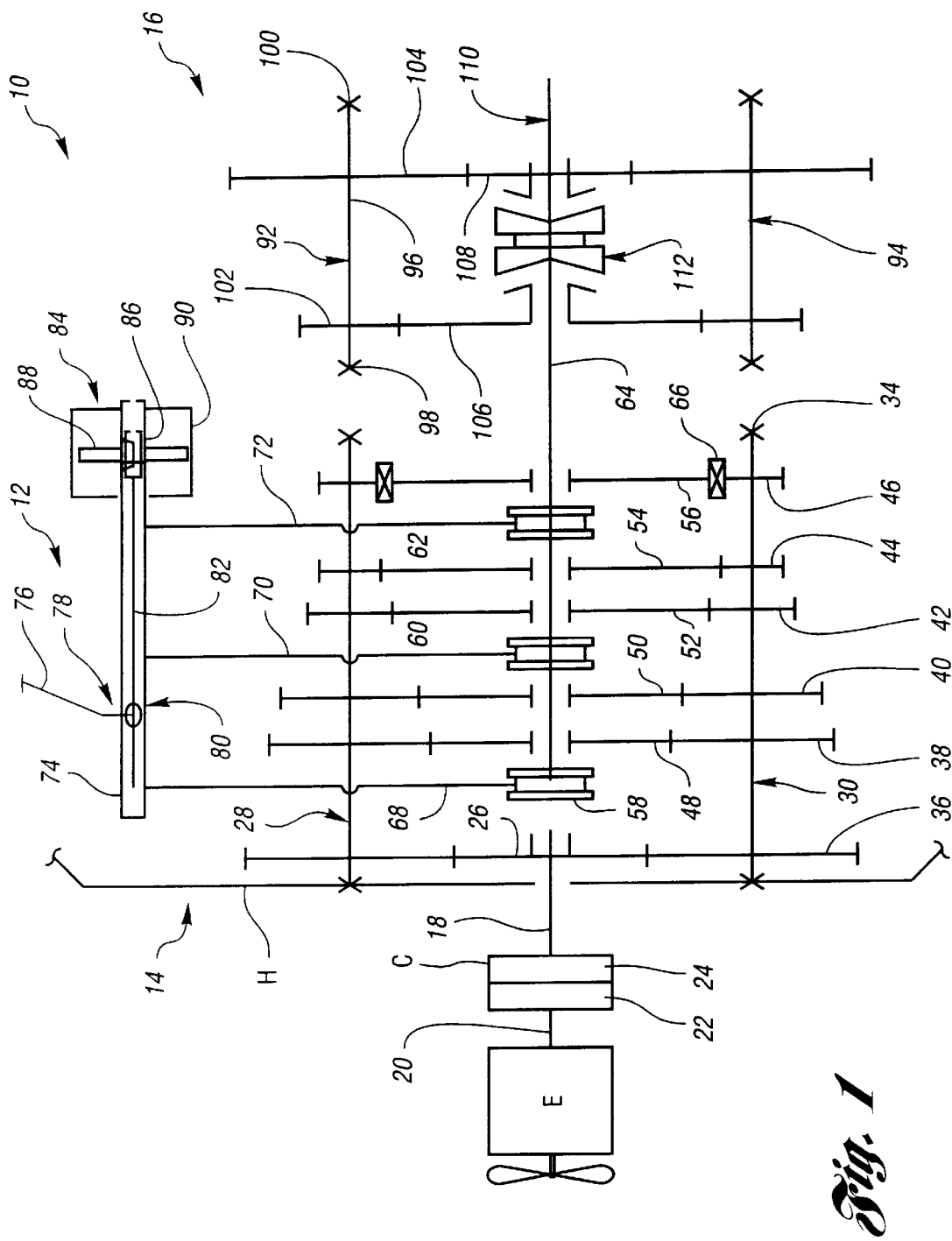
FIG. 1 is a schematic illustration of a compound mechanical transmission having a shifting system according to the present invention.

Certain terminology will be used in the following description for convenience in reference only and will not be limiting. The words "upwardly", "downwardly", "rightwardly", and "leftwardly" will designate directions in the drawings to which reference is made. The words "forward" and "rearward" refer respectively to the front and rear ends of the transmission as conventionally mounted in a vehicle, being respectively from left and right sides of the transmission as illustrated in FIG. 1. The words "inwardly" and "outwardly" will refer to directions toward and away from, respectively, the geometric center of the device and designated parts thereof. This convention or terminology applies to the words specifically mentioned above in addition to their derivatives and words of similar import.

The term "compound transmission" is used to designate a change speed or change gear transmission having a main transmission section with multiple forward speeds and an auxiliary transmission section connected in series with the main transmission section where the selected gear ratio in the main transmission section may be compounded by a selected gear reduction in the auxiliary transmission section. "Synchronized clutch assembly" and words of similar import designate a clutch assembly utilized to nonrotatably couple a selected gear to a shaft by means of a positive clutch in which attempted engagement of said clutch is prevented until the members of the clutch are at substantially synchronous rotation.

The term transmission as used herein shall refer to either a simple transmission or to the main transmission section of a compound transmission.

Referring now to FIG. 1, a schematic diagram illustrating a transmission 10 having a shifting mechanism 12 according to the present invention is shown. Transmission 10 is a compound mechanical transmission having a main section 14 connected in series with an auxiliary section 16 as is well known in the art. Main section 14 provides a plurality of selectable gear ratios which are selected using shifting mechanism 12 according to the present invention. Main section 14 includes an input shaft 18 which is selectively coupled to crank shaft 20 of an engine E via master friction clutch C which includes a driving portion 22 and driven portion 24.

Input shaft 18 of main section 14 is connected to an input gear 26 which drives main section 14 countershaft assemblies 28, 30 which are substantially identical. Countershaft 30 is supported in housing H via bearings 32, 34. A number of countershaft gears 36, 38, 40, 42, 44, 46 are fixed for rotation with countershaft 30 and in constant meshing engagement with corresponding gears 26, 48, 50, 52, 54, and 56, respectively. The main shaft drive gears are selectively coupleable to main shaft 64 via sliding clutch collars 58, 60, 62. Gear 56 is the reverse gear and is coupled to main section countershaft gear 46 via intermediate idler gear 66.

Clutch collars 58, 60, 62 are axially positioned using corresponding shift forks 68, 70, and 72, respectively, as well known in the art. Clutch collars 58, 60, 62 may be either the acting synchronized type or non-synchronized double acting jaw clutches. Shift forks 68, 70, 72 generally form part of shifting mechanism 12 and are operably associated with a selector shaft 74 using a well known slot and key arrangement. A gear shift lever 76 is connected to a shift finger assembly 78 which cooperates with a selector block 80 to transfer operator shifting force from gear lever 76 to selector shaft 74 as explained in greater detail below. As is known in the art, a transverse movement of shift lever 76 rotates selector shaft 74 to select one of the shift forks 68, 70, or 72. A longitudinal or axial movement of the shift lever 76 translates selector shaft 74 along with the selected shift fork to engage or disengage a selected gear ratio.

In one embodiment of the present invention, selector block 80 is directionally coupled to a control rod 82 such that selector shaft 74 is rotationally fixed to control rod 82. However, the directional coupling allows a predetermined relative axial translation between selector shaft 74 and control rod 82. In one embodiment (best illustrated in FIG. 2), the directional coupling is provided by dowel pins which pass through a bore in control rod 82 and an axially elongated slot in selector shaft 74. The axially elongated slot allows a predetermined relative axial translation between control rod 82 and selector shaft 74.

Shift mechanism 12 also includes a cylinder assembly 84 operatively associated with selector shaft 74 and control rod 82 to provide a fluid coupling therebetween. For application to compound transmissions, such as transmission 10, cylinder assembly 84 may be contained within the transmission housing. For simple transmissions, cylinder assembly 84 may be positioned as illustrated in FIGS. 2–3 where the auxiliary section range cylinder is located on similarly arranged compound transmissions. Preferably, a proportional valve 86 is used to direct a pressurized fluid, such as air or hydraulic fluid, to an appropriate side of piston 88 which travels within cylinder 90. The pressurized fluid acts on piston 88 to apply a force to selector shaft 74 to aid in engagement or disengagement of the selected gear ratio via translation of a selected one of shift forks 68, 70, 72. A more detailed illustration and explanation of the operation of shift mechanism 12 is provided with reference to FIGS. 2–4.

As also shown in FIG. 1, auxiliary section 16, similar to main section 14, includes two substantially identical countershaft assemblies 92, 94. Each countershaft assembly 92 includes a countershaft 96 supported within housing H by bearings 98, 100. Auxiliary section countershaft gears 102, 104 are in constant meshing engagement with range gears 106, 108, respectively. Output/range gear 108 is fixed for rotation with an output shaft 110. A two-position synchronized jaw clutch assembly 112 couples range gear 106 to main shaft 64, or alternatively couples range gear 108 to output shaft 110, to provide high range or low range operation, respectively. Of course, the present invention is also applicable to range-type transmissions utilizing a combined splitter/range type auxiliary section.

Transmission 10 is typically referred to as having a "four plus one" main section compounded by a two-speed auxiliary section. While main section 14 provides five forward gear ratios and one reverse gear ratio, typically, the lowest gear ratio provided by coupling input gear 26 directly to main shaft 64 is referred to as a "creeper gear" which is operated only when the auxiliary section is in low range. As such, main section 14 provides four forward ratios which are compounded by auxiliary section 16 which operates in either low range or high range to provide a total of eight forward gear ratios for normal operation in addition to a creeper gear. Of course, the present invention may be utilized in any of the number of mechanical transmissions to reduce the operator effort required during shifting of the transmission.

Referring now to FIG. 2, a partial cross section of a six-speed mechanical transmission having a shifting mechanism according to the present invention is shown. Transmission 110 includes a plurality of gears 112 defining a plurality of gear ratios between a transmission input and output. The gear ratios are selected via a shift lever (not shown) connected to shift finger assembly 114 which includes a shift finger 116 positioned for engagement with a selector block 118. A selector shaft 120 is disposed within shift housing 122 and includes a plurality of associated shift forks 124, 126, 128, 130, each selectable by rotation of selector shaft 120 using a slot 130 and key 132 arrangement as known in the art. Shift forks 124, 126, 128 are coupled to associated clutches 134, 136, and 138, respectively to engage or disengage a corresponding one of the plurality of gears 112 via axial translation of selector shaft 120. Transmission 110 may include various gear state sensors such as neutral sensor 140 and reverse sensor 142.

In the embodiment illustrated in FIG. 2, gear lever force is transmitted in a normal manner to shift finger assembly 114 and shift finger 116 to selector block 118 which is directionally coupled to internal control rod 144 by at least one dowel or pin 146. At least one axially elongated slot 148 cooperates with a corresponding pin 146 to provide the directional coupling. The axially elongated slot may be in control rod 144, selector shaft 120, or both. This provides positive rotation of the control rod and selector shaft while allowing a predetermined relative axial translation between control rod 144 and selector shaft 120.

In the embodiment of FIG. 2, movement of selector block 118 does not immediately translate to movement of selector shaft 120. Pins 146 may translate along selector shaft 120. The length of the slot 148 provides adequate clearance for relative movement between control rod 144 and selector shaft 120, which is about one millimeter in one embodiment. This relative movement is used to operate a proportional valve assembly 150. Control rod 144 is secured or fixed to valve plunger 152 while valve body 154 is secured to selector shaft 120. Piston 156 is secured to valve body 154 and translates within cylinder 158. Control valve 160 directs a pressurized fluid, such as hydraulic fluid or air, from supply 162 to operate piston 156 in either direction, depending on the direction of movement of valve plunger 152. As piston 156 moves within cylinder 158, the pressurized fluid is passed through a controlled exhaust 164. As such, the control valve and cylinder assembly is operably associated with selector shaft 120 and control rod 144 to provide a fluid coupling therebetween. A pressurized fluid within cylinder 158 applies a force on piston 156 which is connected to valve body 154 and selector shaft 120 in response to relative translation between selector shaft 120 and control rod 144.

Referring now to FIG. 3, an alternative embodiment of a shifting mechanism according to the present invention is shown. In this embodiment, selector shaft 166 cooperates with control rod 168 and cylinder assembly 170 to reduce operator shifting effort in a manner similar to the embodiment described and illustrated with reference to FIG. 2. In this embodiment, selector block 172 is connected to selector shaft 166 in a conventional fashion. Control rod 168 is directionally coupled to selector shaft 166 via a pin 174 and axially elongated slot 175. Preferably, control rod 168 is pinned to selector key 169 of selector shaft 166. Cylinder assembly 170 includes proportionate control valve 178 with valve body 180 (which is attached to piston 182) attached to selector shaft 166. Control rod 168 is secured to valve plunger 184. As illustrated, the embodiment of FIG. 3 requires a shorter control rod 168 which may be advantageous, depending upon the particular application.

Referring now to FIGS. 4a–4e, partial cross-sectional views of a cylinder assembly for a shifting mechanism according to the present invention are shown. Cylinder assembly 200 includes a cylinder body 202 and cylinder cover 204 which are secured to transmission housing H using appropriate fasteners (not shown) passing through bores 206. Assembly 200 includes a proportional control valve assembly 208 which includes a valve body 210 secured to a piston 212 by appropriate fasteners 214, such as snap rings, or the like, such that valve body 210 and piston 212 move as a single unit within the cylinder body 202. Selector shaft 216 is secured to valve body 210 so that force applied by the pressurized fluid to piston 212 is transferred through the valve body 210 to selector shaft 216. Control rod 218 is secured to the threaded end of plunger 220 which contacts poppet piston 222. Poppet cylinder 224 cooperates with poppet piston 222 to direct the pressurized fluid through control valve assembly 208 into an appropriate chamber of cylinder 202.

Exhaust control valve 226 cooperates with the poppet valve and plunger 220 to control exhaust of pressurized fluid from the interior of cylinder body 202 through exhaust port 228. A selectable exhaust orifice 230 is used to control the rate of exhaust of the pressurized fluid which is supplied through fluid supply 232. Appropriate seals, such as seals 234, are used at various locations of cylinder assembly 200 to reduce or eliminate fluid leakage.

In operation, as the relative axial motion between selector shaft 216 and controller 218 increases, valve plunger 220 opens a clearance between poppet piston 222 and poppet piston valve seat 236 allowing pressurized fluid entering through supply 232 to pass through channel 238 to the interior portion of cylinder body 202 which applies a force on piston 212. This force is transmitted through valve body 210 to selector shaft 216 to provide a shifting force in addition to the force exerted on the gear shift lever by the operator. As piston 212 travels within cylinder 202, the pressurized fluid is allowed to exhaust from the opposite cylinder chamber. The flow rate of the exhausted fluid is controlled by a predetermined selectable orifice 230 before the fluid passes through exhaust port 228. When force is removed from the shift finger, valve plunger 220 becomes stationery such that valve body 210 closes poppet valve seat 236. Pressurized fluid flow is provided to both piston chambers such that the assistance force generated by cylinder assembly 200 is removed.

The force generated by cylinder assembly 200 is preferably proportional to the relative axial movement between selector shaft 216 and control rod 218. The proportional assistance is governed by the seat clearance of the poppet valve during operation. A greater force applied on the shift finger increases the clearance between poppet valve piston 222 and the valve seat 236 allowing greater fluid flow into the cylinder chambers. Valve plunger 220 operates against a poppet valve spring 240 to react against the opening force. Spring 240 is preloaded so that a minimal level of force is required before any assistance is provided by cylinder assembly 200. Note that the directional coupling illustrated in FIGS. 1–3 is such that a fluid coupling through cylinder assembly 200 is provided for a predetermined relative axial movement between selector shaft 216 and control rod 218. Preferably, approximately 1 mm of travel is provided by the axially elongated slot. Once the relative displacement exceeds this value, the fluid line is transformed to a positive coupling such that any movement of the control rod results in a corresponding movement of the selector shaft, and vice versa.

Figure 4A:
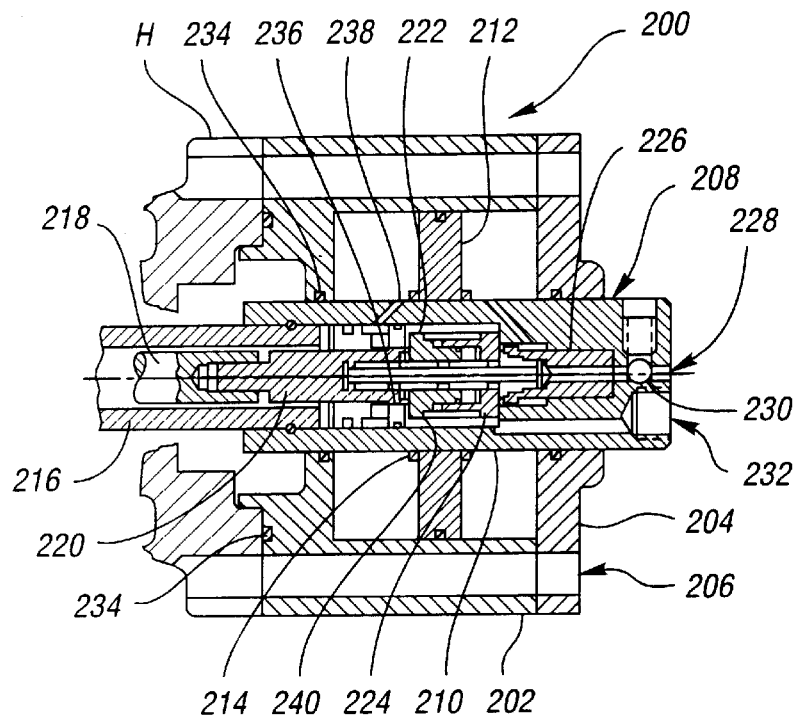
FIGS. 4A–4E provide partial cross-sectional views of a fluid cylinder assembly for providing a proportional shift assist force according to the present invention.
Figure 4B:
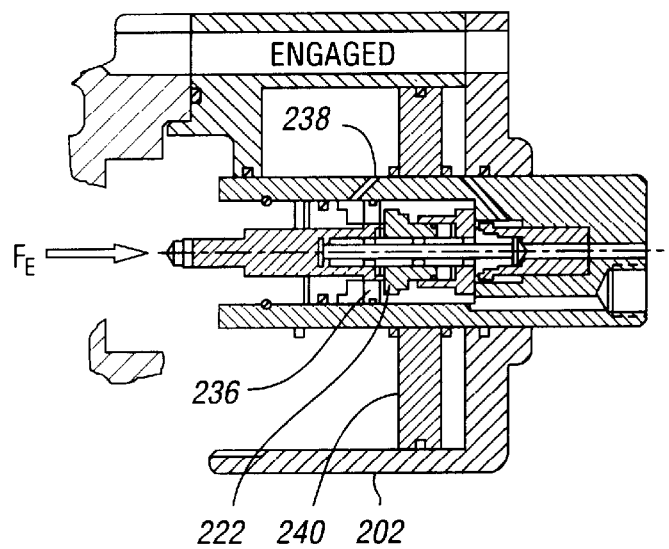

FIGS. 4B–4E illustrate the relative movements within cylinder assembly 200 to engage and disengage the selected synchronizers. The positioning of FIG. 4a represents a neutral position. When a force is applied to control rod 218 toward the right, poppet valve piston 222 overcomes the force of poppet valve spring 240 and is moved off of valve seat 236 allowing pressurized fluid to flow through channel 228 into the left chamber of cylinder 202. This creates a force on piston 212 to assist in engaging the synchronizer.

Figure 4C:
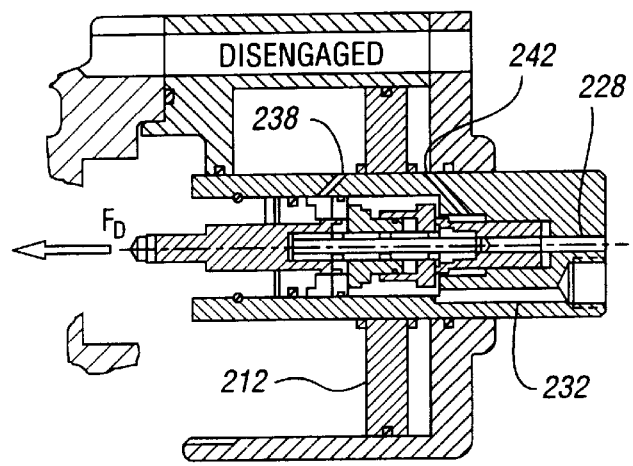
Figure 4D:
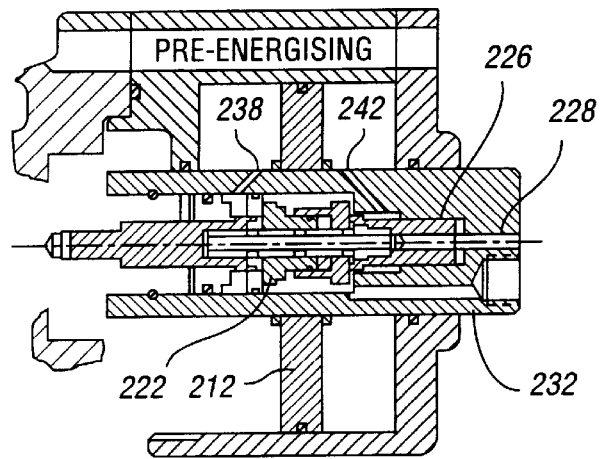
Figure 4E:
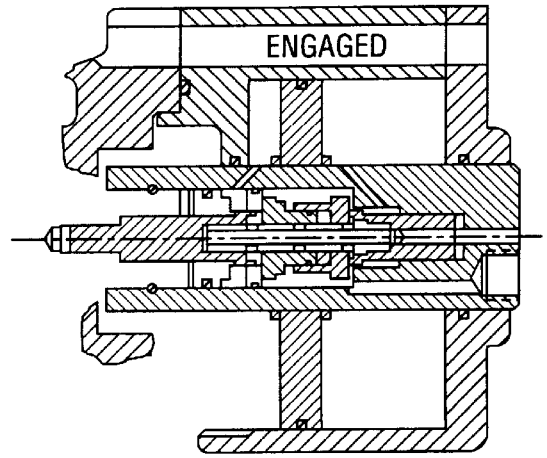

In a similar manner, a force $F_D$ on control rod 218 in the opposite direction as illustrated in FIG. 4C connects pressurized fluid from supply 232 to channel 242 which fills the right chamber of cylinder 202 applying an additional force via piston 212 to the control rod to assist in disengaging the selected synchronizer. Simultaneously, channel 238 is connected to exhaust port 228 through the plunger, poppet valve, and exhaust valve. If the force $F_D$ continues to cause a relative displacement between the control rod and selector shaft, the cylinder assembly will continue to provide a shift assistance through the neutral position to engage the next synchronizer as illustrated in FIG. 4e. A shift to neutral results in the position illustrated in FIG. 4D with the poppet valve piston 222 seated and the exhaust control valve 226 unseated such that pressurized fluid passes directly from supply 232 through both channels 238 and 242 before being exhausted through exhaust port 228 such that no additional shift force is generated by piston 212.

While the best mode contemplated for practicing the invention has been described in detail, it is understood that various modifications are possible without departing from the spirit and scope of the invention as defined by the following claims.

What is claimed is:

1. A shifting mechanism for a mechanical transmission having a plurality of selectable gear ratios, the shifting mechanism comprising:
    a selector shaft having a plurality of shift forks positioned thereabout, wherein rotation of the selector shaft selects one of the shift forks and translation of the selector shaft is operative to translate the selected shift fork to engage or disengage a selected gear ratio;
    a control rod directionally coupled to the selector shaft for positive rotation therewith while allowing a predetermined relative axial translation therebetween;
    a cylinder assembly operatively associated with the selector shaft and the control rod providing a fluid coupling therebetween to apply a force on the selector shaft in response to relative translation between the selector shaft and the control rod.

2. The shifting mechanism of claim 1 wherein the cylinder assembly provides a force proportional to the relative translation.

3. The shifting mechanism of claim 1 wherein the cylinder assembly comprises a hydraulic cylinder assembly.

4. The shifting mechanism of claim 1 wherein the cylinder assembly comprises a pneumatic cylinder assembly.

5. The shift mechanism of claim 1 wherein the cylinder assembly comprises:
    a cylinder housing;
    a piston disposed within the housing;
    a valve body secured to the selector shaft and the piston and fluidly sealed for axial movement relative to the housing;
    a valve plunger disposed within the valve body and secured to the control rod; and
    a control valve disposed within the valve body in contact with the valve plunger for directing pressurized fluid into the cylinder housing to apply the force to the selector shaft via the piston.

6. The shift mechanism of claim 5 wherein the control valve comprises a poppet valve.

7. The shift mechanism of claim 5 wherein the control valve comprises:
    a poppet valve cylinder;
    a poppet valve piston cooperating with the poppet valve cylinder; and
    a spring disposed between the poppet valve cylinder and the poppet valve piston.

8. The shift mechanism of claim 1 further comprising:
    a shift finger assembly;
    a selector block positively coupled to the selector shaft for rotation and translation therewith, the selector block cooperating with the shift finger to transfer shifting force from a shift lever to the selector shaft.

9. The shift mechanism of claim 1 further comprising:
    a shift finger assembly;
    a selector block positively coupled to the control rod for rotation and translation therewith, the selector block cooperating with the shift finger to transfer shifting force from a shift lever to the selector shaft.

10. A shifting mechanism for a mechanical transmission having a plurality of gears defining gear ratios selectable via a shift lever and shift finger assembly, the shifting mechanism comprising:
    a shift bar housing;
    a selector shaft disposed within the shift bar housing, the selector shaft having a plurality of shift forks associated therewith each selectable by rotation of the selector shaft and axially translatable to engage or disengage a selected gear;
    a control rod concentrically disposed within the selector shaft and directionally coupled to the selector shaft via at least one pin passing through the control and the selector shaft wherein one of the control rod and selector shaft includes an axially elongated slot to provide positive rotation of the control rod and selector shaft while allowing a predetermined relative axial translation therebetween;
    a proportional valve assembly operatively associated with the selector shaft and the control rod providing a fluid coupling therebetween to apply a force on the selector shaft in response to relative translation between the selector shaft and the control rod.

11. The shifting mechanism of claim 10 further comprising:
  a selector block fixed for rotation and translation with the selector shaft, the selector block operatively associated with the shift finger assembly to transmit force from the shifting lever to the selector shaft.

12. The shifting mechanism of claim 10 further comprising:
  a selector block fixed for rotation and translation with the control rod, the selector block operatively associated with the shift finger assembly to transmit force from the shifting lever to the selector shaft.

13. The shifting mechanism of claim 10 wherein the selector shaft comprises:
  a plurality of selector shafts each being associated with a single one of the plurality of shift forks, each selector shaft having an associated control rod and proportional valve assembly.

14. The shifting mechanism of claim 10 wherein the proportional valve assembly comprises a hydraulic valve assembly.

15. The shifting mechanism of claim 10 wherein the proportional valve assembly comprises a pneumatic valve assembly.

16. A method for reducing operator effort during shifting of a mechanical transmission having a plurality of gears defining a plurality of selectable gear ratios, the transmission including a shift lever cooperating with a shift finger assembly which actuates a selector shaft having at least one shift fork selected by rotation of the selector shaft, the shift fork being translated in response to translation of the selector shaft to engage or disengage a selected gear ratio, the method comprising:
  coupling the selector shaft to a control rod such that the selector shaft rotates with the control rod while allowing a predetermined axial displacement therebetween; and
  fluidly coupling the selector shaft to the control rod to provide an additional force on the selector shaft while relative displacement of the control rod and selector shaft is between zero and the predetermined axial displacement.

17. The method of claim 16 further comprising:
  varying the additional force supplied to the selector shaft based on a corresponding force applied to the shift lever.

* * * * *